United States Patent
Kruselburger

(10) Patent No.: US 9,328,802 B2
(45) Date of Patent: May 3, 2016

(54) PLANETARY GEAR SET WITH SEVERAL GEAR STAGES

(71) Applicant: IMS GEAR GMBH, Donaueschingen (DE)

(72) Inventor: Markus Kruselburger, Unterkirnach (DE)

(73) Assignee: IMS GEAR GMBH, Donaueschingen (DE)

( * ) Notice: Subject to any disclaimer, the term of this patent is extended or adjusted under 35 U.S.C. 154(b) by 221 days.

(21) Appl. No.: 13/826,397

(22) Filed: Mar. 14, 2013

(65) Prior Publication Data

US 2014/0135165 A1    May 15, 2014

(30) Foreign Application Priority Data

Nov. 13, 2012  (EP) .................................. 12192443

(51) Int. Cl.
*F16H 1/46* (2006.01)
*F16H 55/17* (2006.01)

(52) U.S. Cl.
CPC ............ *F16H 1/46* (2013.01); *F16H 2055/176* (2013.01)

(58) Field of Classification Search
CPC ................ F16H 57/032; F16H 57/023; F16H 2057/0325; F16H 2055/176; F16H 3/46; F16H 3/58; F16H 3/64
USPC .................................................. 192/344, 337
See application file for complete search history.

(56) References Cited

U.S. PATENT DOCUMENTS

| | | | | |
|---|---|---|---|---|
| 1,320,530 A * | 11/1919 | Buehler | | 475/337 |
| 1,502,107 A * | 7/1924 | McCollum | | 475/342 |
| 4,380,274 A * | 4/1983 | Abraham et al. | | 180/308 |
| 4,945,782 A * | 8/1990 | Farrell | | 74/431 |
| 5,830,098 A * | 11/1998 | Kimes | | 475/159 |
| 6,402,653 B1 * | 6/2002 | Jensen | | 475/149 |
| 8,216,107 B2 * | 7/2012 | Tao et al. | | 475/344 |
| 2004/0045389 A1 * | 3/2004 | Pascoe | | 74/434 |
| 2006/0035746 A1 * | 2/2006 | Griggs et al. | | 475/331 |
| 2008/0120843 A1 * | 5/2008 | Thompson et al. | | 29/893.3 |
| 2010/0261572 A1 * | 10/2010 | Riester et al. | | 475/331 |
| 2010/0292043 A1 | 11/2010 | Tao et al. | | |
| 2010/0323836 A1 * | 12/2010 | Wang et al. | | 475/1 |

(Continued)

FOREIGN PATENT DOCUMENTS

CN    101865245 A    3/2010
DE    198 50 169 C1    7/2000

(Continued)

OTHER PUBLICATIONS

Office Action from corresponding Korean patent application 10-2013-0063429, Aug. 22, 2014.

(Continued)

*Primary Examiner* — Robert Hodge
*Assistant Examiner* — Ryan Dodd
(74) *Attorney, Agent, or Firm* — Juneau & Mitchell

(57) ABSTRACT

Planetary gear set with several gear stages, comprising an annular ring with which the planet gears are in engagement with at least one gear stage; according to the invention it is provided that at least one circular insert part with external and internal gearing is arranged in an annular ring, whereby the external gearing is in engagement with the annular ring and the internal gearing meshes with planet gears of another gear stage.

8 Claims, 2 Drawing Sheets

(56) References Cited

U.S. PATENT DOCUMENTS

2013/0255438 A1* 10/2013 Kieninger ........... B29C 65/1654
74/606 R
2013/0269305 A1* 10/2013 Wang et al. .................... 56/14.7

FOREIGN PATENT DOCUMENTS

| JP | 63 214546 A | 9/1988 |
|----|----|----|
| JP | 2005-098339 | 4/2005 |
| JP | 2009-057996 | 3/2009 |

OTHER PUBLICATIONS

Search Report issued by the European Patent Office, Mar. 6, 2013.
Office Action of corresponding Russian patent application No. 2013 134 999, dated Aug. 25, 2014.
Office Action of corresponding Chinese patent application No. 20130229237.2, dated Sep. 25, 2015.

* cited by examiner

PLANETARY GEAR SET WITH SEVERAL GEAR STAGES

CROSS REFERENCE TO RELATED APPLICATIONS

This patent application claims priority to European Patent Application 12 192 443.5, filed on Nov. 13, 2012.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention relates to a planetary gear set with several gear stages.

The function of planetary gear sets is known. In the center, there is a sun gear that is driven by a drive motor which is connected by way of a motor flange and/or drive flange to the planetary gear set. The sun gear transmits its motion to at least two or three rotating planet gears forming a gear stage which are arranged on the bearing pin of a planet carrier. With several gear stages, the last planet carrier is tightly connected to an output shaft mounted in an output flange and thus provides for power transmission at the output. On the outside, the planet gears run in a gear housing with internal gearing the so-called annular ring.

From DE 20 2006 006 116 U1, a planetary gear set of this general type is known in which several planet gears of several gear stages that are axially in succession mesh at the same time with an annular ring. This annular ring is segmented in axial direction so that each annular ring segment forms an annular ring for a gear stage. These annular rings, in axial succession with mutual centering, are inserted coaxially in a housing.

In such a planetary gear set, the individual gear stages can be constructed as different types of modules so that at least two annular rings have different internal gearing.

Such a planetary gear set with annular rings segmented in axial direction requires, for one thing, a face side centering means on each of the annular rings that are in engagement with each other for axial positioning and, for another, locking means for radial fixing of each individual annular ring in the housing. In order to ensure play-free assembly of the individual components between the annular rings, close tolerances must be complied with especially with respect to the centering means and the locking means of the annular ring, which makes the manufacturing of the individual components more expensive.

BACKGROUND OF THE INVENTION

The current state of knowledge is as follows.

Starting from this state of the art, the object of the invention is to produce a planetary gear set which has a simple modular construction for implementing different gear stages, whereby the components are connected with each other so that they rotate together and are as interconnected as possible without play.

This object is achieved by a planetary gear set with the characteristics claimed herein.

BRIEF SUMMARY OF THE INVENTION

In a preferred embodiment, a planetary gear set with several gear stages, comprising an internally geared annular ring with which the planet gears are in engagement with at least one gear stage, further comprising wherein at least one circular insert part with external and internal gearing is arranged in an annular ring, whereby the external gearing is in engagement with the annular ring and the internal gearing meshes with planet gears of another gear stage.

In another preferred embodiment, the planetary gear set as disclosed, further comprising wherein the annular ring has straight gearing, which is in engagement with the external gearing of the insert part that is designed as straight gearing.

In another preferred embodiment, the planetary gear set as disclosed, further comprising wherein the internal gearing of the insert part is designed as helical gearing.

In another preferred embodiment, the planetary gear set as disclosed, further comprising wherein (i) the annular ring is designed with a first and second internal gearing section in axial direction, whereby the planet gears of the at least one gear stage are in engagement with the first gearing section and the external gearing of the insert part is in engagement with the second internal gearing section and (ii) for forming a transition from the first internal gearing section to the second internal gearing section, a shoulder is provided, which the insert part contacts with its face side.

In another preferred embodiment, the planetary gear set as disclosed, further comprising wherein for forming the shoulder, the crown line diameter of the gearing in the area of the first gearing section of the annular ring is smaller than the crown line diameter of the gearing of the second internal gearing section of the annular ring.

In another preferred embodiment, the planetary gear set as disclosed, further comprising wherein for forming a face-side projection of the annular ring, the second internal gearing section is longer in axial direction than the axial length of the insert part.

In another preferred embodiment, the planetary gear set as disclosed, further comprising a motor flange designed to form a spline with the projection.

In another preferred embodiment, the planetary gear set as disclosed, further comprising wherein that the insert part forms a first gear stage with the other gear stage, which meshes with a drive pinion coupled with a drive.

In another preferred embodiment, the planetary gear set as disclosed, further comprising wherein the planet gears that mesh with the annular ring form at least one second gear stage.

In another preferred embodiment, the planetary gear set as disclosed, further comprising wherein the planet gears meshing with the annular ring are provided as the third gear stage.

DETAILED DESCRIPTION OF THE INVENTION

Figure 1:
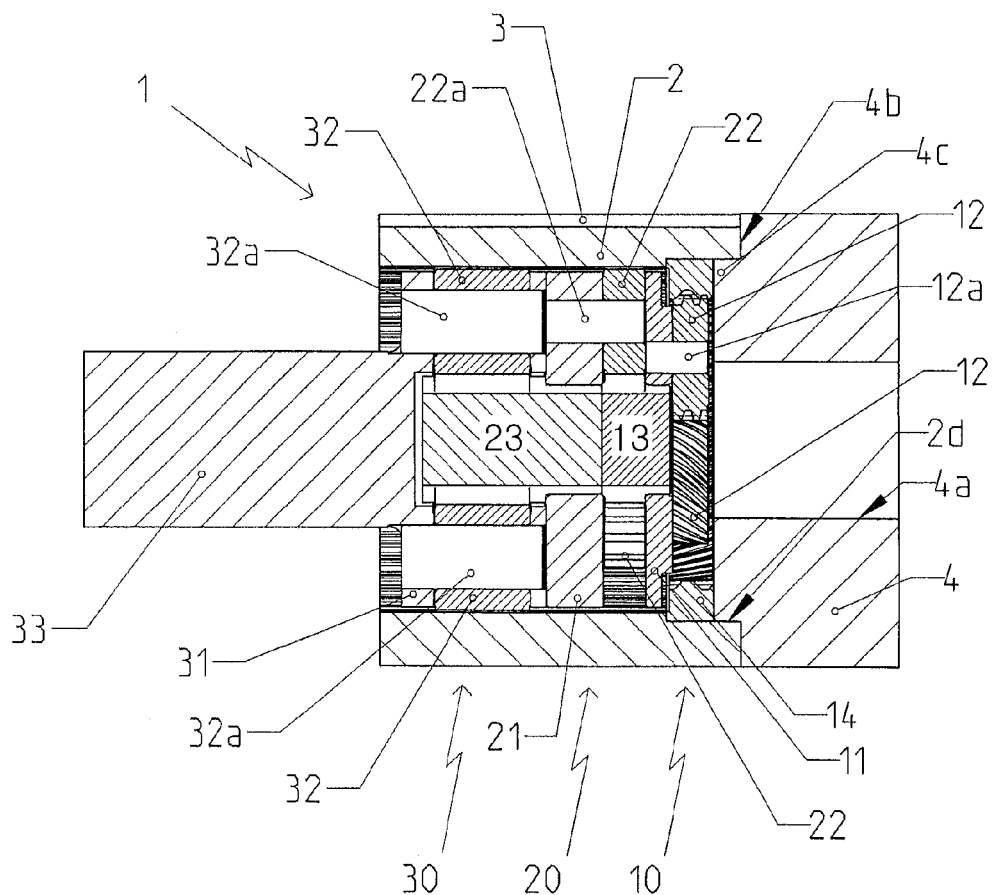
FIG. 1 is a line drawing evidencing a cross section representation of a planetary gear set with several gear stages as an exemplary embodiment of the invention.

The invention is a planetary gear set with several gear stages which comprises an annular ring with internal gearing with which the planet gears are in engagement in at least one gear stage distinguishes itself according to the invention in that at least one circular insert part with external and internal gearing is arranged in the annular ring, whereby the external gearing is in engagement with the annular ring and the internal gearing meshes with planet gears of another gear stage.

With this planetary gear set according to the invention, different gear stages can be integrated in a simple manner since only the insert part designed in the manner of a ring gear with inner and external gearing needs to be inserted into the single-piece annular ring assigned to all gear stages. In this case, the external gearing of the insert part, with the internal gearing of the annular ring, forms the interface between these two components and leads to a connection with mutual rotation without additional centering or fixing means, whereby because of the gearing this connection can simultaneously be designed so it is essentially free of play. The insert part, as annular ring, together with its internal gearing and with this meshing planet gear forms a gear stage that differs from that gear stage of the planet gears that mesh with the common annular ring.

In addition, the construction of a planetary gear set according to the invention with several, e.g. three gear stages with two different gear stages requires a smaller number of individual parts in comparison to the planetary gear set known according to DE 20 2006 006 116 U1.

In addition, great variability exists in the design of different gear stages since several such insert parts can be installed in a common annular ring for forming different gears, which also can have different internal gearing.

Finally, the manufacturing of a planetary gear set according to the invention is possible in a cost-effective manner since only the insert part is required as an additional part without the need to change the design of the annular ring that all the gear stages are assigned to.

In one embodiment of the invention, the annular ring has straight gearing as the internal gearing, which are in engagement with the external gearing of the insert part also formed as straight gearing. In this way, a simple installation of the insert part into the annular ring is possible.

In an advantageous manner, according to another embodiment of the invention, it is provided that the internal gearing of the insert part is designed as helical gearing. In this way, with a gear stage formed by this insert part with helically geared planet gears, a high transmission of force can be implemented.

In another design of the invention, it is provided that in axial direction the annular ring is designed with a first and second internal gearing section, whereby the at least one gear stage is in engagement with the first internal gearing section of the planet gears and the external gearing of the insert part is in engagement with the second internal gearing section and, in addition to forming a transition from the first inner gear section to the second internal gearing section, a shoulder is provided that the insert part contacts with its face side.

Because of such a shoulder, a mounting of the insert part is ensured that is free of rotational and axial play and thus at the same time the installation is simplified since no additional fixing in axial direction, e.g. by screwing or riveting, is required. For forming the shoulder, preferably the crown line diameter of the gearing in the area of the first internal gearing section of the annular ring is smaller than the crown line diameter of the gearing of the second internal gearing section of the annular ring.

According to a further development, another advantage results in that for formation of a face-side projection of the annular ring, the second internal gearing section is longer in axial direction than the axial length of the insert part.

Because of such a projection, preferably a motor flange can be designed in such a way that it forms a spline with this projection. In this way, a frictional connection can be implemented between the annular ring and the motor flange, which leads to increased stiffness, whereby torques can be transferred significantly better than in the state of the art. Instead of a motor flange, a cast gearing can also be implemented.

According to a further development, a simple structure of the planetary gear set is achieved when the insert part forms a first gear stage with the other gear stage, which meshes with a drive pinion coupled with a drive. Preferably the planet gears meshing with the annular ring then form at least one second gear stage.

Other gear stages can be provided, for example a third, with planet gears that mesh with the annular ring assigned to all the gear stages.

DETAILED DESCRIPTION OF THE FIGURES

Referring now to the figures, the planetary gear set 1 according to FIG. 1 consists of a cylindrical housing 3 with three gear stages 10, 20 and 30. An annular ring 2 with straight internal gearing in a first internal gearing section 2a and a second internal gearing section 2b (see FIG. 2) extends over the entire construction length of housing 3, i.e. over all three gear stages 10, 20 and 30.

On the drive side, the housing 3 is connected by a motor flange 4 with a bearing hole 4a for a drive shaft of a drive motor. This drive shaft ends in a drive pinion which meshes, as a sun gear, with three planet gears 12 of first gear stage 10.

Figure 3:
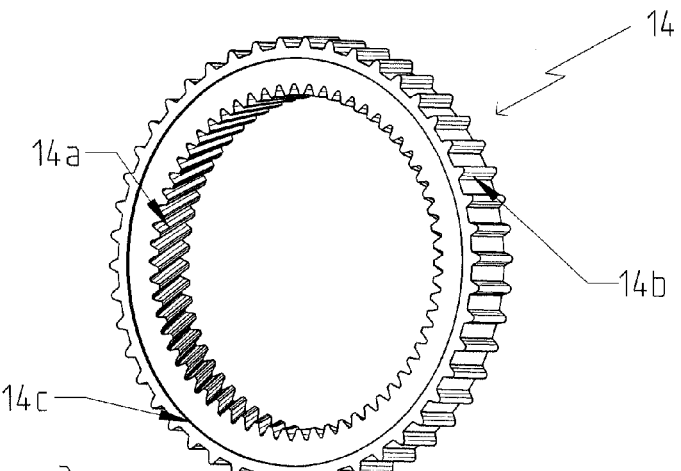
FIG. 3 is a line drawing evidencing a perspective view of the insert part of the planetary gear set according to FIG. 1.

This first gear stage 10 comprises a planet carrier 11 that holds the three planet gears 12 with a sun gear 13 on the output side and a circular insert part 14, which according to FIG. 3 is designed in the manner of a ring gear with helical internal gearing 14a and straight external gearing 14b. The three planet gears 12 of first gear stage 10 are each mounted so that they can rotate on a pin 12a assigned to the planet carrier 11.

On the drive side, the insert part 14 is inserted in the annular ring 2 so that the external gearing of insert part 14 engages with frictional connection in the straight internal gearing of the second internal gearing section 2b of the annular ring 2.

Figure 2:
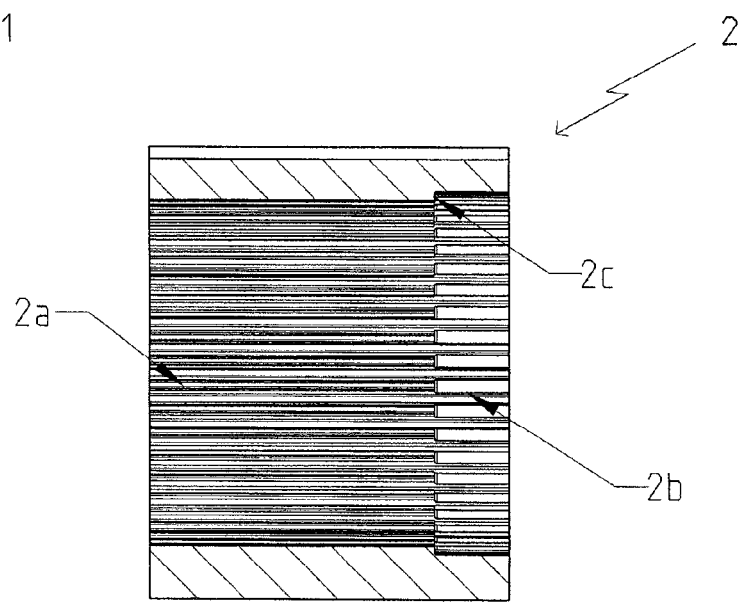
FIG. 2 is a line drawing evidencing a cross section representation of the annular ring assigned to the gear stages of the planetary gear set according to FIG. 1.

In axial direction, the internal gearing of the annular ring 2 according to FIG. 2 is divided into two sections with a first gearing section 2a having straight internal gearing and a second internal gearing section 2b also having straight gearing, whereby the second internal gearing section 2b, as already mentioned above, holds the insert part 14, which contacts a shoulder 2c formed at the transition of the two internal gearing sections 2a and 2b.

Figure 5:
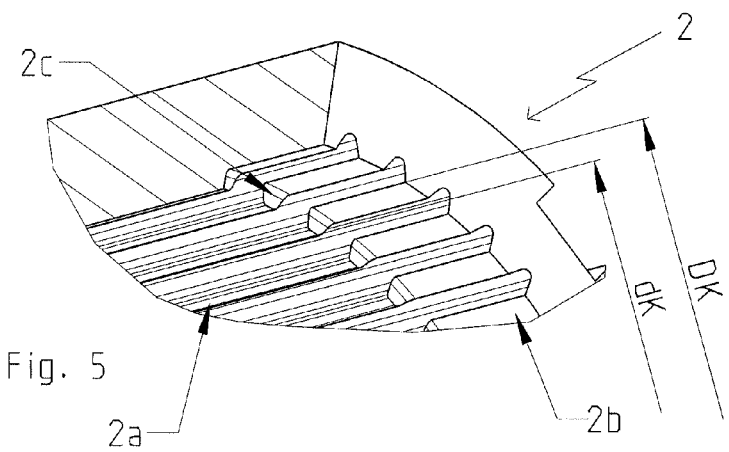
FIG. 5 is a line drawing evidencing a perspective partial representation of the annular ring according to FIG. 4, but without the insert part.

According to FIG. 5, this shoulder 2c occurs in that the crown line diameter Dk of the gearing of the second internal gearing section 2b is greater than the crown line diameter dk of the gearing of the first internal gearing section 2a, but whereby the root line diameter for the gearing of the two internal gearing sections 2a and 2b are the same, i.e. that only the gearing height of the gearing of the second internal gearing section 2b is reduced in comparison to the gearing height of the gearing of the first internal gearing section 2a.

Figure 4:
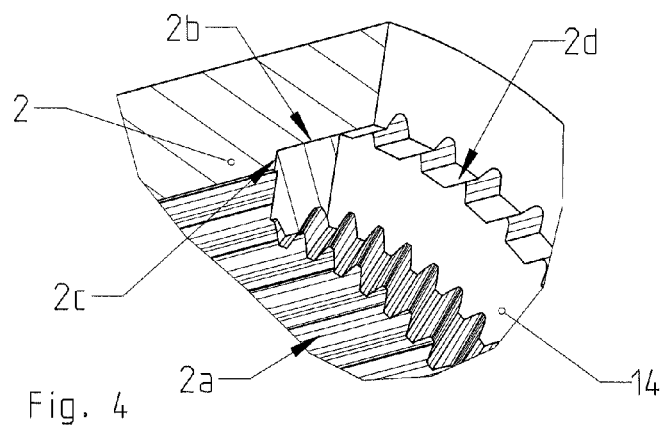
FIG. 4 is a line drawing evidencing a perspective partial representation of an annular ring with insert part installed.

According to FIG. 4, the axial length of the second internal gearing section 2b of the annular ring 2 is longer than the axial length of the insert part 14 so that on the drive side face of the annular ring 2, a projection 2d occurs in comparison to the face side of the insert part 14 inserted in the annular ring 2.

This projection 2d is used to form a spline with the motor flange 4. For this purpose, on the face side 4b turned away from the motor, the motor flange 4 is designed with a circular-cylindrical connecting flange 4c, the lateral surface of which has an external gearing adapted to the internal gearing 2b of the projection 2d. This means this motor flange 4 can be inserted by way its connecting flange 4c in the annular ring 2 for forming a spline so that the face side 4b of the motor flange 4 contacts the face sides of the housing 3 and the annular ring 2 so that their surfaces mate.

The external gearing 14b of the insert part 14 is adapted to the internal gearing of the second internal gearing section 2b of the annular ring 2, i.e. to its shortened gearing with a flat crown. In this way, a friction connection that is free of play is produced between the insert part 14 and the annular ring 2 without any additional centering or connecting means being necessary. The output side face surface of the insert part 14 is recessed with a circular shoulder 14c.

The first gearing section 2a of the annular ring 2 is used to hold the second and third gear stages 20 and 30.

The second gear stage 20 comprises a planet carrier 21 with three planet gears 22 arranged on bolts 22a, which mesh with the internal gearing of the first internal gearing section 2a of the annular ring 2 and an output-side sun gear 23, which is in engagement with four planet gears 32 of the third gear stage 30.

In this third gear stage 30, the four planet gears 32 that mesh with the internal gearing of the first internal gearing section 2a are mounted on bolts 32a, which are arranged on a planet carrier 31. In addition, on the output side, this planet carrier 31 has an output shaft 33 of the planetary gear set 1. An output flange (not shown) closes the output side of the housing 3 of the planetary gear set 1.

LIST OF REFERENCE NUMBERS

1 Planetary gear set
2 Annular ring of the planetary gear set 1
2a First internal gearing section of the annular ring 2
2b Second internal gearing section of the annular ring 2
2c Shoulder on the transition from the first internal gearing section 2a to the second internal gearing section 2b
2d Projection of the annular ring 2
3 Housing of the planetary gear set 1
4 Motor flange of the planetary gear set 1
4a Bearing hole of motor flange 4
4b Output side face surface of the motor flange 4
4c Connecting flange of face surface 4b
10 First gear stage of the planetary gear set 1
11 Planet carrier of the first gear stage 10
12 Planet gear of the planet carrier 11
12a Bolt of the planet gear 12
13 Sun gear of the planet carrier 11
14 Insert part, crown gear of the first gear stage 10
14a Internal gearing of the insert part 14
14b External gearing of the insert part 14
14c Face side shoulder of the insert part 14
20 Second gear stage of the planetary gear set 1
21 Planet carrier of the second gear stage 20
22 Planet gear of the planet carrier 21
22a Bolt of the planet gear 22
23 Sun gear of the planet carrier 21
30 Third gear stage of the planetary gear set 1
31 Planet carrier of the third gear stage 30
32 Planet gear of the planet carrier 31
32a Bolt of the planet gear 32
33 Output shaft of the planet carrier 31

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

I claim:

1. A planetary gear set with several gear stages and planet gears, comprising an internally geared annular ring with which planet gears of at least one gear stage are in engagement, further comprising wherein at least one circular insert part with external and internal gearing is arranged in said annular ring, whereby the external gearing is in engagement with the annular ring and the internal gearing meshes with planet gears of another gear stage, further comprising wherein (i) the annular ring is designed with a first and a second internal gearing section in an axial direction, whereby the planet gears of the at least one gear stage are in engagement with the first gearing section and the external gearing of the insert part is in engagement with the second internal gearing section and (ii) for forming a transition from the first internal gearing section to the second internal gearing section, a shoulder is provided, which the insert part contacts with a face-side of the insert part, further comprising wherein for forming a face-side projection of the annular ring, the second internal gearing section is longer in the axial direction than the axial length of the insert part, and further comprising a motor flange designed to form a spline with the face-side projection of the annular ring.

2. The planetary gear set of claim 1, further comprising wherein the annular ring has straight gearing, which is in engagement with the external gearing of the insert part that is designed as straight gearing.

3. The planetary gear set of claim 1, further comprising wherein the internal gearing of the insert part is designed as helical gearing.

4. The planetary gear set of claim 1, further comprising wherein (i) the annular ring is designed with a first and second internal gearing section in axial direction, whereby the planet gears of the at least one gear stage are in engagement with the first gearing section and the external gearing of the insert part is in engagement with the second internal gearing section and (ii) for forming a transition from the first internal gearing section to the second internal gearing section, a shoulder is provided, which the insert part contacts with a face side of the insert part.

5. The planetary gear set of claim 4, further comprising wherein for forming the shoulder, the crown line diameter of the gearing in the area of the first gearing section of the annular ring is smaller than the crown line diameter of the gearing of the second internal gearing section of the annular ring.

6. The planetary gear set of claim 1, further comprising wherein the another gear stage comprises the insert part and forms a first gear stage with planet gears, which meshes with a drive pinion coupled with a drive.

7. The planetary gear set of claim 4, further comprising wherein the planet gears that mesh with the annular ring form at least one second gear stage.

8. The planetary gear set of claim 5, further comprising wherein the planet gears meshing with the annular ring are provided as a third gear stage.

* * * * *